United States Patent
Massieu et al.

(10) Patent No.: US 7,451,933 B2
(45) Date of Patent: Nov. 18, 2008

(54) OPTOELECTRONIC DEVICE, PROCESS AND ARTICLE FOR ACQUIRING MACHINE-READABLE SYMBOLS, SUCH AS BAR CODES

(75) Inventors: Jean-Louis Massieu, Montauban (FR); H. Sprague Ackley, Seattle, WA (US)

(73) Assignee: Intermec IP Corp., Everett, WA (US)

( * ) Notice: Subject to any disclaimer, the term of this patent is extended or adjusted under 35 U.S.C. 154(b) by 674 days.

(21) Appl. No.: 11/110,571

(22) Filed: Apr. 19, 2005

(65) Prior Publication Data

US 2006/0231629 A1    Oct. 19, 2006

(51) Int. Cl.
| | |
|---|---|
| G02B 26/12 | (2006.01) |
| G02B 26/10 | (2006.01) |
| G02B 26/00 | (2006.01) |
| G02B 5/08 | (2006.01) |
| G06K 7/10 | (2006.01) |
| G06K 5/04 | (2006.01) |
| G06K 9/00 | (2006.01) |
| G06K 9/22 | (2006.01) |
| G06K 19/06 | (2006.01) |

(52) U.S. Cl. .................. 235/462.39; 235/462.12; 235/462.25; 235/462.36; 235/462.38

(58) Field of Classification Search ............ 235/462.12, 235/462.25, 462.36, 462.38, 462.39
See application file for complete search history.

(56) References Cited

U.S. PATENT DOCUMENTS

| | | | | |
|---|---|---|---|---|
| 4,768,109 A | * | 8/1988 | Matsuo | 386/44 |
| 4,800,256 A | * | 1/1989 | Broockman et al. | 235/462.28 |
| 4,855,581 A | * | 8/1989 | Mertel et al. | 235/462.07 |
| 4,916,297 A | * | 4/1990 | Tukada et al. | 235/462.12 |
| 4,988,852 A | | 1/1991 | Krishnan | 235/462 |
| 5,157,687 A | * | 10/1992 | Tymes | 375/140 |
| 5,200,597 A | * | 4/1993 | Eastman et al. | 235/455 |
| 5,237,156 A | * | 8/1993 | Konishi et al. | 235/375 |
| 5,278,398 A | * | 1/1994 | Pavlidis et al. | 235/462.12 |
| 5,296,691 A | * | 3/1994 | Waldron et al. | 235/462.12 |
| 5,378,883 A | | 1/1995 | Batterman et al. | 235/472 |
| 5,392,150 A | * | 2/1995 | Inagaki et al. | 359/221 |
| 5,394,217 A | * | 2/1995 | Gaboury et al. | 396/233 |
| 5,414,252 A | * | 5/1995 | Shinoda et al. | 235/462.07 |
| 5,440,111 A | * | 8/1995 | Eastman et al. | 235/462.36 |
| 5,464,972 A | * | 11/1995 | Massieu et al. | 235/462.38 |
| 5,539,192 A | * | 7/1996 | Scofield et al. | 235/462.37 |
| 5,594,232 A | * | 1/1997 | Giordano | 235/462.43 |
| 5,705,799 A | * | 1/1998 | Li | 235/462.43 |
| 5,742,156 A | * | 4/1998 | Sezi | 324/76.24 |
| 5,914,477 A | * | 6/1999 | Wang | 235/462.1 |
| 6,149,061 A | * | 11/2000 | Massieu et al. | 235/462.33 |
| 6,186,400 B1 | * | 2/2001 | Dvorkis et al. | 235/462.45 |
| 6,239,729 B1 | * | 5/2001 | Takeuchi | 341/100 |
| 6,328,214 B1 | | 12/2001 | Akel et al. | 235/462.27 |
| 6,330,974 B1 | | 12/2001 | Ackley | 235/472.01 |

(Continued)

*Primary Examiner*—Daniel I Walsh
(74) *Attorney, Agent, or Firm*—Seed IP Law Group PLLC (57) ABSTRACT

A device and a process for acquiring symbols by interleaving data samples in a plurality of data sets gathered during sampling of returns from a plurality of scanning passes. In one embodiment, the sampling frequency is proportional to the scanning frequency by a quotient of twice the number of samples in a representation and an integer such that the quotient is an irreducible fraction.

45 Claims, 7 Drawing Sheets

U.S. PATENT DOCUMENTS

| | | | |
|---|---|---|---|
| 6,375,076 B1 | 4/2002 | Massieu et al. | 235/462.22 |
| 6,435,411 B1 | 8/2002 | Massieu et al. | 235/454 |
| 6,484,944 B1 | 11/2002 | Manine et al. | 235/462.38 |
| 6,616,044 B1* | 9/2003 | Gu | 235/462.14 |
| 6,687,403 B1 | 2/2004 | Akel et al. | 382/201 |
| 6,732,930 B2 | 5/2004 | Massieu et al. | 235/462.1 |
| 6,776,342 B1 | 8/2004 | Thuries et al. | 235/462.15 |
| 6,978,937 B2* | 12/2005 | Iwaguchi et al. | 235/462.16 |
| 7,344,082 B2* | 3/2008 | Zhu et al. | 235/462.14 |
| 2001/0049846 A1* | 12/2001 | Guzzi et al. | 8/158 |
| 2002/0125324 A1* | 9/2002 | Yavid et al. | 235/462.45 |
| 2003/0019937 A1* | 1/2003 | Colley et al. | 235/462.36 |
| 2003/0024989 A1* | 2/2003 | Aizawa | 235/462.36 |
| 2003/0136843 A1* | 7/2003 | Ralph et al. | 235/462.33 |
| 2003/0136844 A1* | 7/2003 | Dvorkis | 235/472.01 |
| 2003/0178491 A1* | 9/2003 | Blake et al. | 235/462.36 |
| 2004/0031850 A1* | 2/2004 | Shellhammer | 235/462.1 |
| 2004/0108383 A1* | 6/2004 | Good et al. | 235/462.32 |
| 2004/0129784 A1* | 7/2004 | Iwaguchi et al. | 235/462.16 |
| 2004/0164162 A1* | 8/2004 | Watanabe et al. | 235/462.25 |
| 2006/0231629 A1* | 10/2006 | Massieu | 235/462.32 |
| 2006/0283954 A1* | 12/2006 | Ralph et al. | 235/462.32 |

* cited by examiner

OPTOELECTRONIC DEVICE, PROCESS AND ARTICLE FOR ACQUIRING MACHINE-READABLE SYMBOLS, SUCH AS BAR CODES

TECHNICAL FIELD

This disclosure generally relates to automatic data collection, and particularly relates to devices for reading machine-readable symbols such as bar code symbols, matrix or area code symbols and/or or stacked code symbols.

BACKGROUND

The automatic data collection (ADC) arts include numerous systems for representing information in machine-readable form. For example, a variety of symbologies exist for representing information in bar code symbols, matrix or area code symbols and/or stacked symbols. A symbology typically refers to a set of machine-readable symbol characters, some of which are mapped to a set of human-recognizable symbols such as alphabetic characters and/or numeric values. Machine-readable symbols are typically composed of machine-readable symbol characters selected from the particular symbology to encode information. Machine-readable symbols typically encode information about an object on which the machine-readable symbol is printed, etched, carried or attached to, for example, via packaging or a tag.

Bar code symbols are a common one-dimensional form of machine-readable symbols. Bar code symbols typically comprise a pattern of vertical bars of various widths separated by spaces of various widths, with information encoded in the relative thickness of the bars and/or spaces, each of which have different light reflecting properties. One-dimensional bar code symbols require a relatively large space to convey a small amount of data.

Two-dimensional symbologies have been developed to increase the data density of machine-readable symbols.

Some examples of two-dimensional symbologies include stacked code symbologies. Stacked code symbologies may be employed where length limitations undesirably limit the amount of information in the machine-readable symbol. Stacked code symbols typically employ several lines of vertically stacked one-dimensional symbols. The increase in information density is realized by reducing or eliminating the space that would typically be required between individual bar code symbols.

Some other examples of two-dimensional symbologies include matrix or area code symbologies (hereinafter matrix code). A matrix code machine-readable symbol typically has a two-dimensional perimeter, and comprises a number of geometric elements distributed in a pattern within the perimeter. The perimeter may, for example, be generally square, rectangular or round. The geometric elements may, for example, be square, round, or polygonal, for example hexagonal. The two-dimensional nature of such a machine-readable symbol allows more information to be encoded in a given area than a one-dimensional bar code symbol.

The various above-described machine-readable symbols may or may not also employ color to increase information density.

A variety of machine-readable symbol readers for reading machine-readable symbols are known. Machine-readable symbol readers typically employ one of two fundamental approaches, scanning or imaging.

In scanning, a focused beam of light is scanned across the machine-readable symbol, and light reflected from and modulated by the machine-readable symbol is received by the reader and demodulated. With some readers, the machine-readable symbol is moved past the reader, with other readers the reader is moved past the machine-readable symbol, and still other readers move the beam of light across the machine-readable symbol while the reader and machine-readable symbol remain approximately fixed. Demodulation typically includes an analog-to-digital conversion and a decoding of the resulting digital signal.

In imaging, the machine-readable symbol reader may flood the machine-readable symbol with light, or may rely on ambient lighting. A one-dimensional (linear) or two-dimensional image capture device or imager such as a charge coupled device (CCD) array captures a digital image of the illuminated machine-readable symbol, typically by electronically sampling or scanning the pixels of the two-dimensional image capture device. The captured image is then decoded, typically without the need to perform an analog to digital conversion.

A two-dimensional machine-readable symbol reader system may convert, for example, two-dimensional symbols into pixels. See, for example, U.S. Pat. No. 4,988,852 issued to Krishnan, U.S. Pat. No. 5,378,883 issued to Batterman, et al., U.S. Pat. No. 6,330,974 issued to Ackley, U.S. Pat. No. 6,484,944 issued to Manine, et al., and U.S. Pat. No. 6,732,930 issued to Massieu, et al.

Scanning type machine-readable symbol readers typically employ a source of coherent light such as a laser diode to produce a beam, and employ a beam deflection system such as an rotating or oscillating mirror to scan the resulting beam across the machine-readable symbols. Conventional laser scanning systems employ progressive symbol sampling. The cost of the beam deflection systems employed in laser scanners can be reduced, and the resistance to shock of such systems can be increased by employing a higher symbol scan rate. However, the use of a higher symbol scan rate in conventional systems requires a higher sampling rate, and thus a more complex and expensive data interface. Thus, it can be appreciated that a scanning type machine-readable symbol reader with a high scan rate and a reduced sampling rate is desirable.

SUMMARY

In one aspect, a method of acquiring a machine-readable symbol using an optoelectronic device comprises: scanning the machine-readable symbol with a plurality scanning passes occurring at a scanning frequency; receiving reflected scans corresponding to the plurality of scanning passes; converting the reflected scans to an electrical signal; sampling the electrical signal at a sampling frequency thereby producing data samples associated with corresponding scanning passes; interleaving data samples associated with at least two of the scanning passes to produce a representation in a memory, wherein the sampling frequency is proportional to the scanning frequency by a quotient of twice a number of samples in the representation and an integer such that the quotient is an irreducible fraction; and decoding the representation.

In some embodiments, the representation in the memory is a representation in a time domain. In some embodiments, the representation in the memory is a representation in a spatial domain.

In some embodiments, interleaving data samples comprises: storing a first data sample in the memory at an address; incrementing the address; and storing a second data sample in the memory at the incremented address. In some embodiments, the memory address is incremented by one. In another embodiment, the memory address is incremented by the integer.

In some embodiments, the machine-readable symbol is a bar code symbol.

In some embodiments, the plurality of scanning passes is a plurality of backward scanning passes, the representation is a first representation associated with the plurality of backward scanning passes, and the method further comprises: scanning the machine-readable symbol with a plurality of forward scanning passes occurring at the scanning frequency, wherein receiving reflected scans corresponding to the plurality of scanning passes comprises receiving reflected scans corresponding to the plurality of backward scanning passes and to the plurality of forward scanning passes; and interleaving data samples associated with at least two of the forward scanning passes to produce a second representation in the memory.

In some embodiments, the method further comprises: scanning the machine-readable symbol with additional scanning passes occurring at the scanning frequency; receiving additional reflected scans corresponding to the additional scanning passes; converting the additional reflected scans corresponding to the additional scanning passes to an additional electrical signal; sampling the additional electrical signal at the sampling frequency thereby producing additional data samples associated with corresponding additional scanning passes; and interleaving data samples associated with at least two of the additional scanning passes to refresh the representation in the memory.

In another aspect, a method of acquiring a machine-readable symbol using an optoelectronic device comprises: scanning the machine-readable symbol with a plurality of scanning passes occurring at a scanning frequency; receiving reflected scans corresponding to the plurality of scanning passes; converting the reflected scans to an electrical signal; sampling the electrical signal at a sampling frequency thereby producing data samples associated with corresponding scanning passes; and interleaving data samples associated with at least two of the scanning passes to produce a representation in a memory.

In some embodiments, the representation in the memory is a representation in a time domain. In some embodiments, the representation in the memory is a representation in a spatial domain.

In some embodiments, interleaving data samples comprises: storing a first data sample in the memory at an address; incrementing the address; and storing a second data sample in the memory at the incremented address. In some embodiments, the memory address is incremented by one. In some embodiments, the representation in the memory comprises a number of data samples and the memory address is incremented by an integer such that a quotient of twice the number of data samples in the representation and the integer is an irreducible fraction. In some embodiments, the representation in the memory comprises a number of data samples and the memory address is incremented by an integer such that a quotient of the number of data samples in the representation and the integer is an irreducible fraction.

In some embodiments, the representation in the memory comprises a number of data samples and the sampling frequency is proportional to the scanning frequency by a quotient of twice the number of data samples in the representation and an integer, such that the quotient is an irreducible fraction. In some embodiments, the representation comprises a number of data samples and the sampling frequency is proportional to the scanning frequency by a quotient of the number of data samples in the representation and an integer, such that the quotient is an irreducible fraction.

In some embodiments, the plurality of scanning passes is a plurality of backward scanning passes, the representation is a first representation associated with the plurality of backward scanning passes and the method further comprises: scanning the machine-readable symbol with a plurality of forward scanning passes occurring at the scanning frequency, wherein receiving reflected scans corresponding to the plurality of scanning passes comprises receiving reflected scans corresponding to the plurality of backward scanning passes and to the plurality of forward scanning passes; and interleaving data samples associated with at least two of the forward scanning passes to produce a second representation in the memory.

In another aspect, an optoelectronic device for acquiring a machine-readable symbol comprises: a beam subsystem configured to generate scanning beam passes at a scanning frequency; a reception subsystem configured to convert light reflected from the scanning beam passes to an electrical signal; a sampler configured to sample the electrical signal at a sampling frequency, thereby producing sets of samples associated with corresponding scanning beam passes; and a memory configured to interleave samples from at least two of the sets of samples, thereby producing a representation in the memory.

In some embodiments, the beam subsystem comprises a rotating polygonal mirror. In some embodiments, the beam subsystem comprises a silicon micro-mirror suspension system configured to oscillate at the scanning frequency.

In some embodiments, the memory is configured to produce a time-domain representation. In some embodiments, the memory is configured to produce a spatial-domain representation.

In some embodiments, the memory is configured to store a data sample at an address; increment the address and store a subsequent data sample at the incremented address. In some embodiments, the memory is configured to increment the address by one. In some embodiments, the representation comprises a number of data samples and the memory is configured to increment the address by an integer such that a quotient of the number of data samples in the representation and the integer is an irreducible fraction.

In some embodiments, the sampling frequency is proportional to the scanning frequency by a quotient of a number of data samples in the representation in the memory and an integer, such that the quotient is an irreducible fraction. In some embodiments, the sampling frequency is proportional to the scanning frequency by a quotient of twice a number of data samples in the representation in the memory and an integer, such that the quotient is an irreducible fraction.

In some embodiments, the scanning frequency exceeds 200 Hz.

In some embodiments, the scanning beam passes comprise backward and forward scanning beam passes and the memory is configured to interleave samples from sets of samples associated with at least two backward scanning beam passes and from sets of samples associated with at least two forward scanning beam passes, thereby producing two representations in the memory.

In some embodiments, the memory is configured to interleave samples from sets of samples associated with additional scanning beam passes, thereby refreshing the representation in the memory.

In another aspect, a device for acquiring a machine-readable symbol comprises: means for generating a scanning beam at a scanning frequency; means for converting light reflected from the scanning beam to an electrical signal; means for sampling the electrical signal at a sampling frequency; and means for interleaving samples of the electrical signal associated with a plurality of scanning beam passes, thereby producing a representation.

In some embodiments, the means for generating a scanning beam comprises a silicon micro-mirror suspension system. In some embodiments, the means for interleaving samples comprises a memory having a modulo and the sampling frequency is proportional to the scanning frequency by a quotient of the modulo and an integer such that the quotient is an irreducible fraction. In some embodiments, the machine-readable symbol is a bar code symbol.

In another aspect, a computer readable memory medium loadable in a memory of a processor of a system comprises software code portions for causing the system to: scan a machine-readable symbol with a plurality of scanning passes occurring at a scanning frequency; sample, at a sampling frequency, an electrical signal corresponding to light reflected from the plurality of scanning passes, thereby producing samples associated with corresponding scanning passes; and interleave samples associated with at least two scanning passes, thereby producing a representation in a memory. In some embodiments, the computer readable memory medium comprises software code portions for causing the system to convert the representation from a time-domain format to a spatial-domain format.

In some embodiments, the sampling frequency is proportional to the scanning frequency by a quotient of a number of data samples in the representation divided by an integer such that the quotient is an irreducible fraction. In some embodiments, the sampling frequency is proportional to the scanning frequency by a quotient of twice a number of data samples in the representation divided by an integer such that the quotient is an irreducible fraction.

In another aspect, a device for acquiring a machine-readable symbol comprises: means for sampling an electrical signal at a sampling frequency, the electrical signal associated with reflected scans of the machine-readable symbol occurring at a scanning frequency; means for interleaving samples of the electrical signal associated with a plurality of scanning beam passes, thereby producing a representation; and means for decoding the representation.

In some embodiments, the means for interleaving samples comprises a memory having a modulo and the sampling frequency is proportional to the scanning frequency by a quotient of the modulo and an integer such that the quotient is an irreducible fraction. In some embodiments, the means for interleaving samples is configured to store the representation in the memory as a spatial domain representation. In some embodiments, the means for interleaving samples is configured to store the representation in the memory as a time domain representation.

In some embodiments, the means for sampling an electrical signal at a sampling frequency comprises a clock and a divider. In some embodiments the device further comprises means for driving a beam subsystem. In some embodiments, the means for decoding the representation comprises a processor and a first memory and the means for interleaving samples comprises a second memory, wherein the means for interleaving samples is configured to store the representation in the second memory and the means for decoding the representation is configured to access the second memory.

The disclosure also relates to a device and a process which are characterized in combination by all or some of the characteristics mentioned hereinbefore or hereinafter.

Further objects, characteristics and advantages of the invention will emerge on reading the following description which refers to the accompanying figures describing various non-limiting embodiments of the invention.

BRIEF DESCRIPTION OF DRAWINGS

The size and relative positions of elements in the drawings are not necessarily drawn to scale. For example, the shapes of various elements are not drawn to scale, and some of these elements are arbitrarily enlarged and positioned to improve drawing legibility. Further, the particular shapes of elements, as drawn are not intended to convey any information regarding the actual shape of the particular elements, and have been solely selected for their ease and recognition in the drawings.

DETAILED DESCRIPTION

In the following description, certain specific details are set forth in order to provide a thorough understanding of various embodiments of the invention. However, one skilled in the art will understand that the invention may be practiced without these details. In other instances, well-known structures associated with machine symbol readers, decoders, imaging devices, optics, computers, memories, computer networks, data structures, databases and networks, have not been described in detail to avoid unnecessarily obscuring the descriptions of the embodiments of the invention.

Unless the context requires otherwise, throughout the specification and claims which follow, the word "comprise" and variations thereof, such as "comprises" and "comprising" are to be construed in an open, inclusive sense, that is as "including but not limited to."

Laser scanners are commonly used for acquiring symbols because they generally provide a large depth of field, and are generally free from pixel aperture filtering and smearing effect. The beam deflection is achieved generally with an oscillating mirror, with a rotating polygonal mirror, with a non-linear optic element or with a combination thereof. Miniature laser scanners generally use a low-inertia mirror oscillating near its eigenfrequency.

Figure 1:
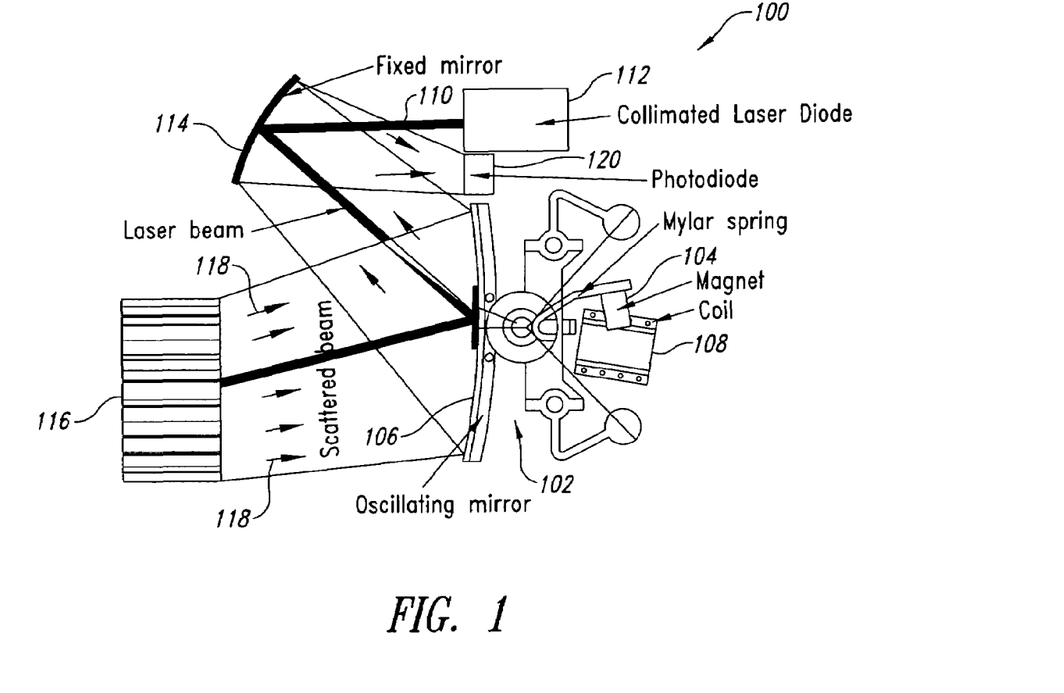
FIG. 1 is functional block diagram of an embodiment of an electromagnetic beam deflection system suitable for use in an embodiment of a laser scanning system employing interleaved sampling.

FIG. 1 illustrates an optoelectronic device for acquiring machine-readable symbols comprising a one-dimensional galvanometer scanner system 100 suitable for use in a laser scanning system employing interleaved sampling. An electromagnetic beam deflection system or oscillating set 102 is comprised of a magnet 104 and an oscillating mirror 106. The oscillation of the oscillating mirror is maintained by an alternating magnetic field in a coil 108. A laser beam 110 is generated by, for example, a collimated laser diode 112. The beam 110 is reflected off a fixed mirror 114 and strikes the oscillating mirror 106. The beam 110 is then reflected off the oscillating mirror 106 and strikes a target 116, which is illustrated as a one-dimensional bar code symbol. Backscattered light 118 is returned to the oscillating mirror 106, where it is reflected and strikes the fixed mirror 114. The fixed mirror 114 reflects the returned light, which strikes a photodiode 120. When the system 100 is, for example, a handheld bar code reader requiring a limited sampling rate and dataflow interface, the oscillation mirror 106 may have a relatively low eigen-frequency. A 20 Hz scanner with 2000 samples per trace would, for example, use a sampling rate of 40 ksps when progressive sampling is employed.

Silicon-surface micro-machining reduces the size and cost of miniature laser scanners. A thin laser-deflecting mirror may be employed, for example, when light collection is independent of beam deflection. A laser-deflecting mirror may have a thickness of, for example, a few tenths of a micron with a surface the size of the laser beam section.

Figure 2:
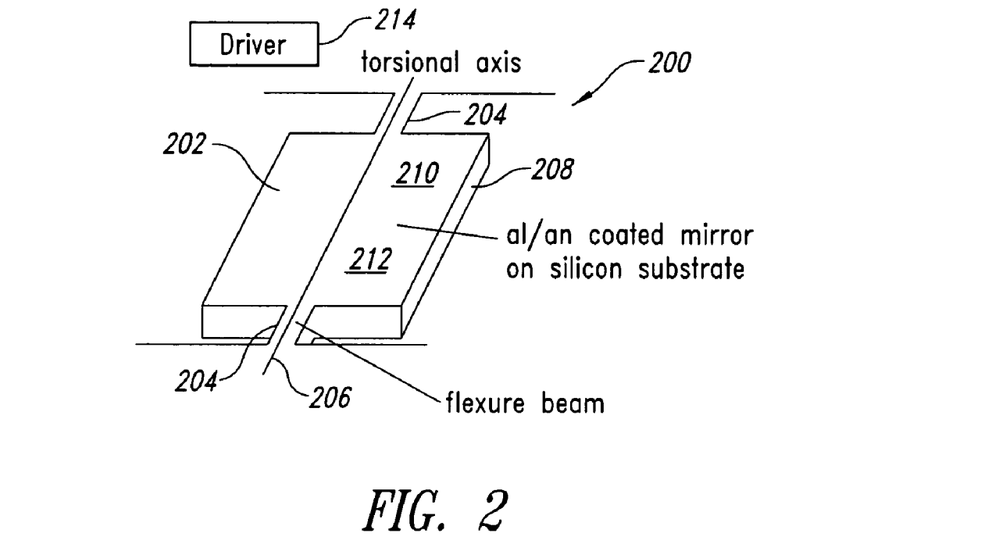
FIG. 2 is an isometric projection of an embodiment of a silicon micro mirror suspension system suitable for use in an embodiment of a laser scanning system employing interleaved sampling.
Figure 5:
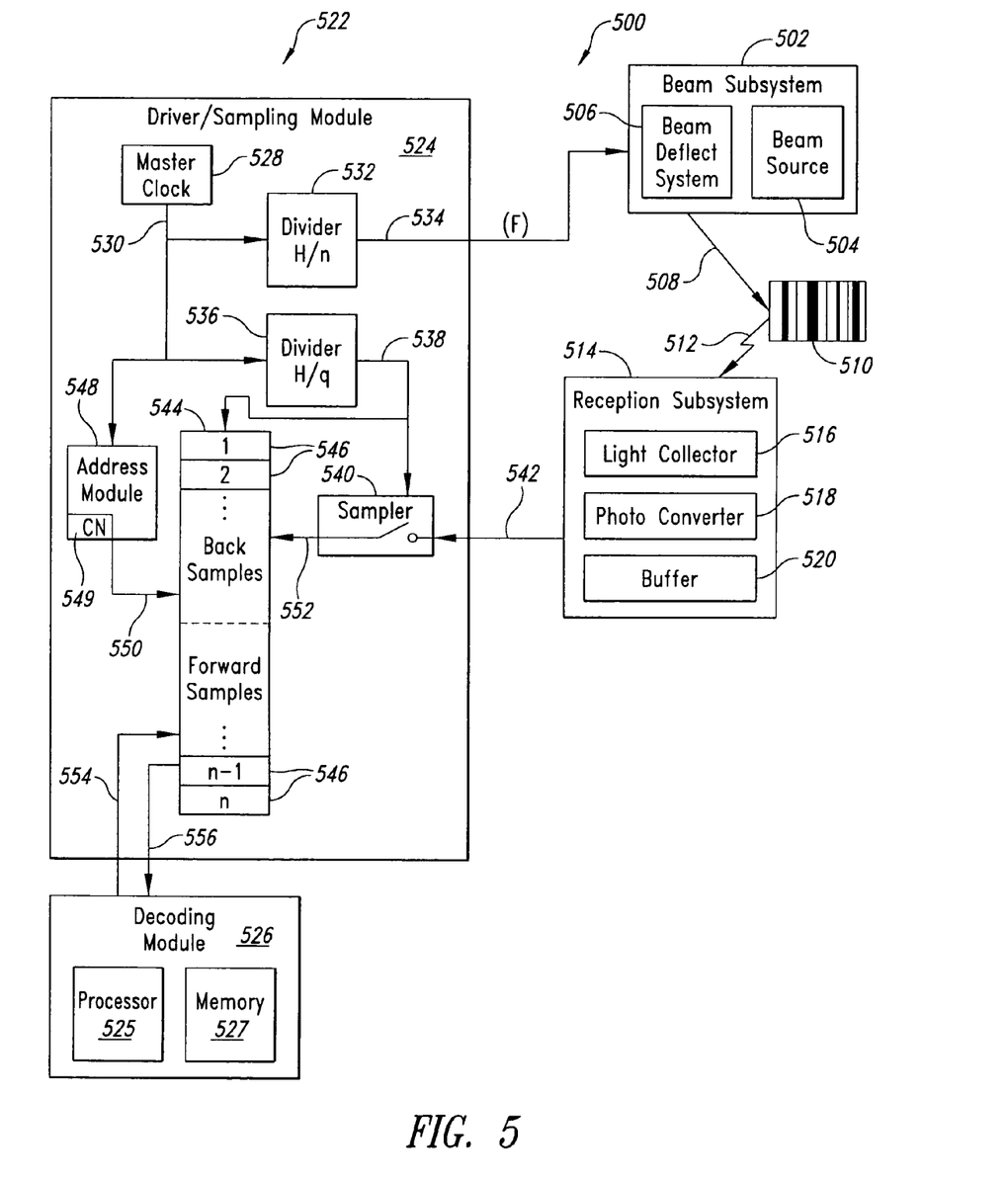
FIG. 5 is a functional block diagram of an embodiment of a laser scanning system employing interleaved sampling.

FIG. 2 illustrates a silicon micro-mirror suspension system 200 for use with electrostatic actuation and suitable for use as part of a beam deflection system in a laser scanning system employing interleaved sampling (see FIG. 5). The mirror 202 is suspended on a flexure beam 204 having a torsion axis 206. The mirror 202 is formed on a silicon substrate 208 with a layer of reflective coating 210 on a first surface 212 of the substrate 208. The layer of reflective coating 210 may comprise any suitable reflective material, such as, for example, aluminum, gold, or an aluminum/gold alloy. The suspension system 200 comprises a driver 214 for electrostatically driving oscillation of the mirror 202.

Figure 3:
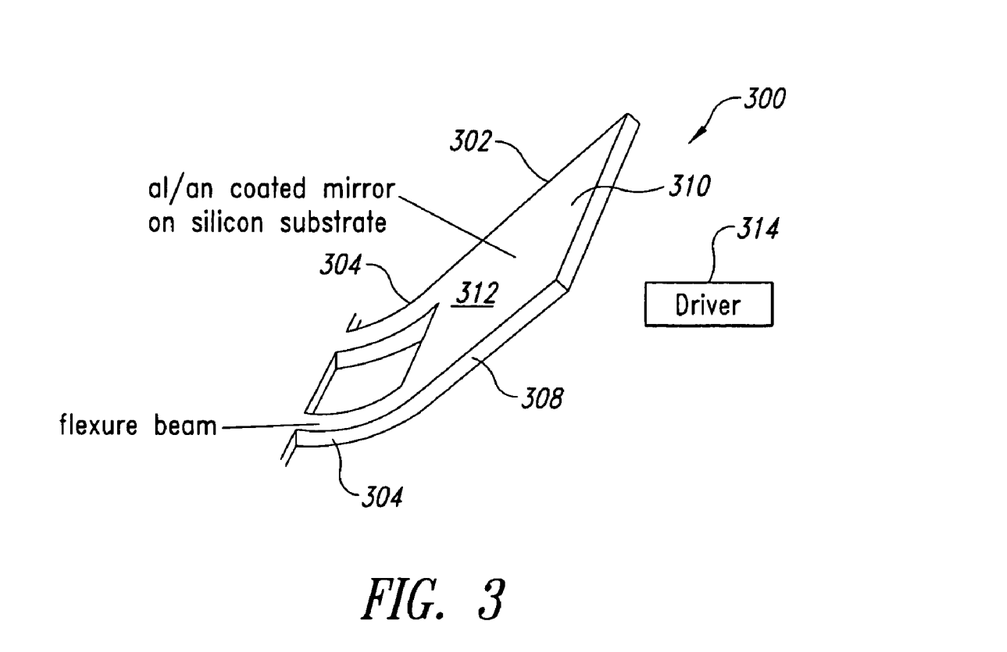
FIG. 3 is an isometric projection of another embodiment of a silicon micro mirror suspension system suitable for use in an embodiment of a laser scanning system employing interleaved sampling.

FIG. 3 illustrates silicon micro-mirror suspension system 300 for use with thermal actuation and suitable for use as part of a beam deflection system in a laser scanning system employing interleaved sampling (see FIG. 5). The mirror 302 is supported by two flexure beams 304 and is formed on a silicon substrate 308 with a layer of reflective coating 310 on a first surface 312. The layer of reflective coating 310 may comprise any suitable reflective material, such as, for example, aluminum, gold, or an aluminum/gold alloy. The micro-mirror suspension system 300 comprises a driver 314 for thermally driving oscillation of the mirror 302.

With regard to FIGS. 2 and 3, a low inertia mirror 202, 302 coupled with flexure beams 208, 308 of minimal stiffness, generally leads to a high eigenfrequency. This allows the mirror 202, 302 to be run in resonance when low intensity actuation forces are employed. The mirror 202, 302 can typically run from hundreds to several thousand of scans per second. Thus, the mirrors 202, 302 illustrated in FIGS. 2 and 3 are well suited to acquire stacked codes or two-dimensional codes with large amounts of data.

Figure 4:
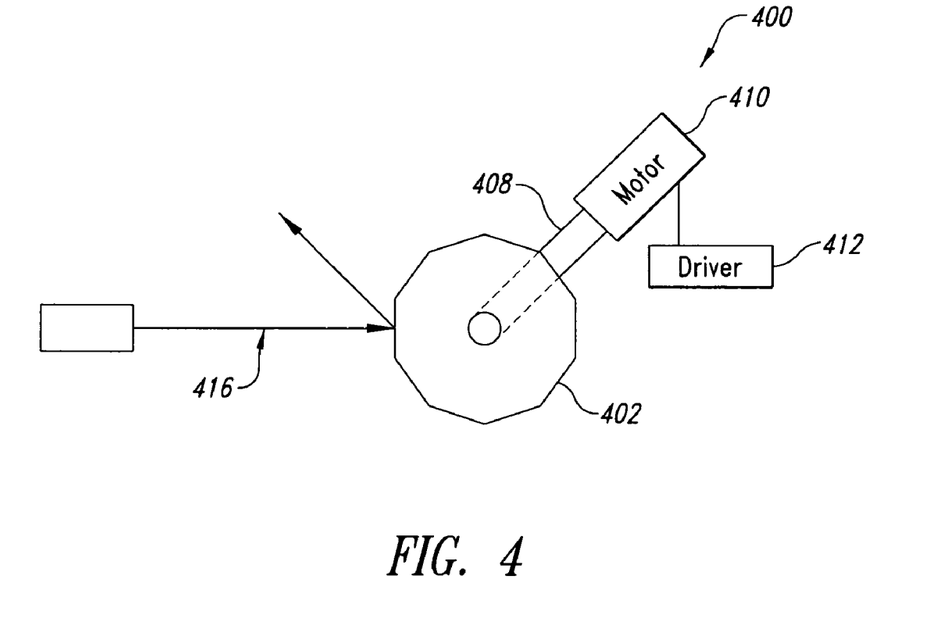
FIG. 4 is a top plain view of an embodiment of a rotating polygonal mirror suitable for use in an embodiment of a laser scanning system employing interleaved sampling.

FIG. 4 illustrates a rotating polygonal mirror system 400, which can be employed as part of a beam deflection system in a laser scanning system employing interleaved sampling (see FIG. 5). A polygonal mirror 402 is mounted on a shaft 408 coupled to a motor 410. The motor 410 is driven by a driver 412 so as to generate a laser scan at a desired frequency. Light from a laser beam 416 is reflected off the rotating surfaces of the polygonal mirror 402.

Conventional laser scanners acquire the symbol, such as a bar code, sample in one trace as a progressive scan. This produces nF/2 samples per scan (i.e., one forward or backward pass), where F is the oscillating frequency of the laser scanner and n is the number of samples per scanning oscillation. For a scanner with a sinusoidal frequency F, a sampling frequency $f_s$, and a peak-to-peak optical angle $\theta_M$, $$\theta_{(t)}=(\theta_M/2)\sin(2\pi F t) \quad \text{(Eq. 1)}.$$

With progressive sampling, the number of points per line is $f_s/2F$ (two lines per scanning period). The spot velocity is at a maximum at the middle of the line $\theta'$, where:

$$\theta'=\theta_M\pi F \quad \text{(Eq. 2)}$$

and the angular resolution is:

$$\theta_R=\theta'/f_s=(\theta_M\pi F)/f_s \quad \text{(Eq. 3)}$$

where the Nyquist frequency is:

$$U_{NYQUIST}=1/(2\theta_R d)=f_s/(2\theta_M\pi F d) \quad \text{(Eq. 4)},$$

d is the reading distance and $$f_s>2\theta_{M\pi F d} U_{NYQUIST} \quad \text{(Eq. 5)}.$$

With a half-optical scanning of $\theta_M$=25°, a 0.1 mm line resolution at 150 mm ($U_{Nyquist}$=5 cycles/mm), the sampling frequency is related to the oscillating frequency by:

$$f_s>4112F \quad \text{(Eq. 6)}.$$

Because there are $f_s/2F$ samples in a line of scan, there are 4112/2=2056 samples in each backward and forward trace. For an electromagnet scanner, such as the one illustrated in FIG. 1, oscillating at 18 Hz, the signal would be sampled at $f_s$=37 ksps for progressive sampling. In contrast, a miniature silicon mirror, such as those illustrated in FIGS. 2 and 3, of 1.5 mm width would typically resonate at 250 Hz, which leads to a sampling frequency 514 kHz for progressive sampling.

Thus, the eigenfrequency of silicon micro mirror suspension systems, such as those illustrated in FIGS. 2 and 3, is such that a fast data interface is generally required to use progressive sampling. In addition, a high oscillating frequency can increase the shock-resistance of a scanner, but in turn also requires a fast data interface for progressive sampling. A fast data interface, however, is not always available or practical for use in a low-end bar code reading applications.

Interlaced scanning is used in television displays to reduce flicker and the electronic bandwidth. Due to the high scan rate of a laser scanner, successive scan samples, such as bar code scan samples, may be quasi-invariant. The principal of interlaced scanning can be adopted for use with a high-scan rate laser scanner. Instead of interlacing lines as is done in television displays, samples from multiple scan passes are interleaved. This allows the data flow throughput to be reduced without sacrificing spatial resolution by interleaving the samples collected over several successive lines of scanning, as described in more detail below.

FIG. 5 is a functional block diagram of an embodiment of an optoelectronic device or scanning system 500 adopted to use interleaved sampling. The scanning system 500 has a beam subsystem 502 comprising a beam source 504, such as an edge emitting laser diode or a vertical cavity surface emitting diode, and a beam deflection system 506, which may comprise, for example, the oscillating set 102 illustrated in FIG. 1, the micro-mirror suspension system 200 illustrated in FIG. 2, or the micro-mirror suspension system 220 illustrated in FIG. 3. The beam subsystem 502 generates a beam 508 for scanning a symbol 510, which is illustrated as a bar code.

Reflected or backscattered light 512 is received by a reception subsystem 514, either directly or via the beam deflection system 506. The reception subsystem 514 as illustrated comprises a light collector 516, such as a photodiode, a photoconverter 518, and a buffer 520. A host system 522 comprises a driving/sampling module 524 and a decoding module 526. The decoding module 526 comprises a processor 525 and a memory 527.

The driving/sampling module 524 comprises a master clock 528 producing a clock signal 530 with a frequency H. The clock signal 530 is supplied to a first divider 532, which produces a driving signal 534 of frequency F, that is equal to the frequency H divided by n, where n is an integer. The driving signal 534 is used to drive the laser scanning subsystem 502 to scan the symbol 510 with a scanning frequency F.

The clock signal 530 also is supplied to a second divider 536, which produces a sampling driver signal 538 of frequency $f_s$, that is equal to the frequency H divided by q, where q is an integer. The sampling driver signal 538 is used to drive a sampler 540 that samples a signal S(t) 542 at a reduced sampling rate k*F, where k=n/q, as discussed in more detail below. The signal S(t) is a representation in the time domain of the scanned symbol 510 (e.g., a time domain representation of a bar code) produced by the reception subsystem 514.

The sampling signal 538 also is used to drive a dual access memory 544. The dual access memory 544 is arranged to store n samples 546 of the signal S(t), half of which are forward scan samples and half of which are backward scan samples. The clock signal 530 also drives an address module 548. The address module 548 as illustrated comprises a counter 549 with a modulo n and supplies an address 550 to the memory 544. The memory 544 stores data samples received from the sampler 540 via a data link 552 at the addresses provided by the address module 548. The decoding module 526 accesses the memory 544 via an address link 554 and a data link 556. Means other than a master clock and a plurality of dividers may be employed to drive the beam subsystem 502, the sampler 540, the memory 544 and the address module 548 at the desired frequencies.

When the beam deflection system 506 comprises an oscillating mirror, the oscillating frequency of the mirror can be equal to the frequency F of the driving signal 534. The samples may be effectively interleaved when the sampling frequency $f_s$ is proportional to the oscillating frequency F as set forth in equations 7 and 8:

$$f_s = kF \quad \text{(Eq. 7)}$$

where:

$$k = n/q \quad \text{(Eq. 8)}$$

and n and q are integers such that k is an irreducible fraction. Thus, the sampling rate is decreased by a factor q in interleaved sampling as compared to progressive sampling. This produces a sampled signal as set forth in equation 9:

$$S(i) = S_i, S_{i+1}, S_{i+2}, \ldots, \quad \text{(Eq. 9)}$$

where i is the time-domain sampling index and, as noted above, equation 8 is satisfied such that k is an irreducible fraction.

Because the interleaved samples are interleaved chronologically, the samples may be reordered spatially before interpretation. This can be done before storage in the memory 544, for example by using the addresses supplied by the address module 548 to reorder the samples, as illustrated in FIG. 5. In that way, the decoding module 526 can directly retrieve spatially ordered samples. Alternatively, the samples may be reordered after being stored in the memory 544. For example, the samples could be reordered by the decoding module 526. The samples can be reordered according to the relationship set forth in equation 10:

$$j = q*i \bmod n \quad \text{(Eq. 10)}$$

where j is the spatial-domain index and i is the time-domain index.

The laser scanner 500 illustrated in FIG. 5 thus records samples in a memory 544 of modulo n at locations successively incremented by a factor q. After q scanning oscillation periods, the memory 544 contains two consecutive reordered sample representations corresponding to the symbol 510, as illustrated a bar code. One representation in the memory is produced by storing samples from multiple forward scans and one representation in the memory is produced by storing samples from multiple backward scans. The representations are refreshed in an interleaved manner by storing samples from additional forward and backward scans in the memory. If there is an error in the position of the first sample at the start of the first trace, this will produce a shift of the bar code symbol, which if necessary can be recognized and addressed by the decoding module 526. The principles discussed above can be applied to a scanner employing a rotating polygon mirror, such as the rotating polygon mirror illustrated in FIG. 4, in the beam deflection system 506 with appropriate modifications to the driving sampling module 524 to address the absence of samples produced during backward traces. In addition, the samples comprising the backward sets and the forward sets can be merged, potentially doubling the resolution. Merging the sets, however, would require a more complex driver to control the phase between the sampling frequency $f_s$ and the scanning frequency F.

The advantages of a scanning system employing interleaved sampling, such as the system 500 illustrated in FIG. 5, include the fact that an inexpensive beam deflection system can be employed without requiring the use of a high rate data interface.

Figure 6:
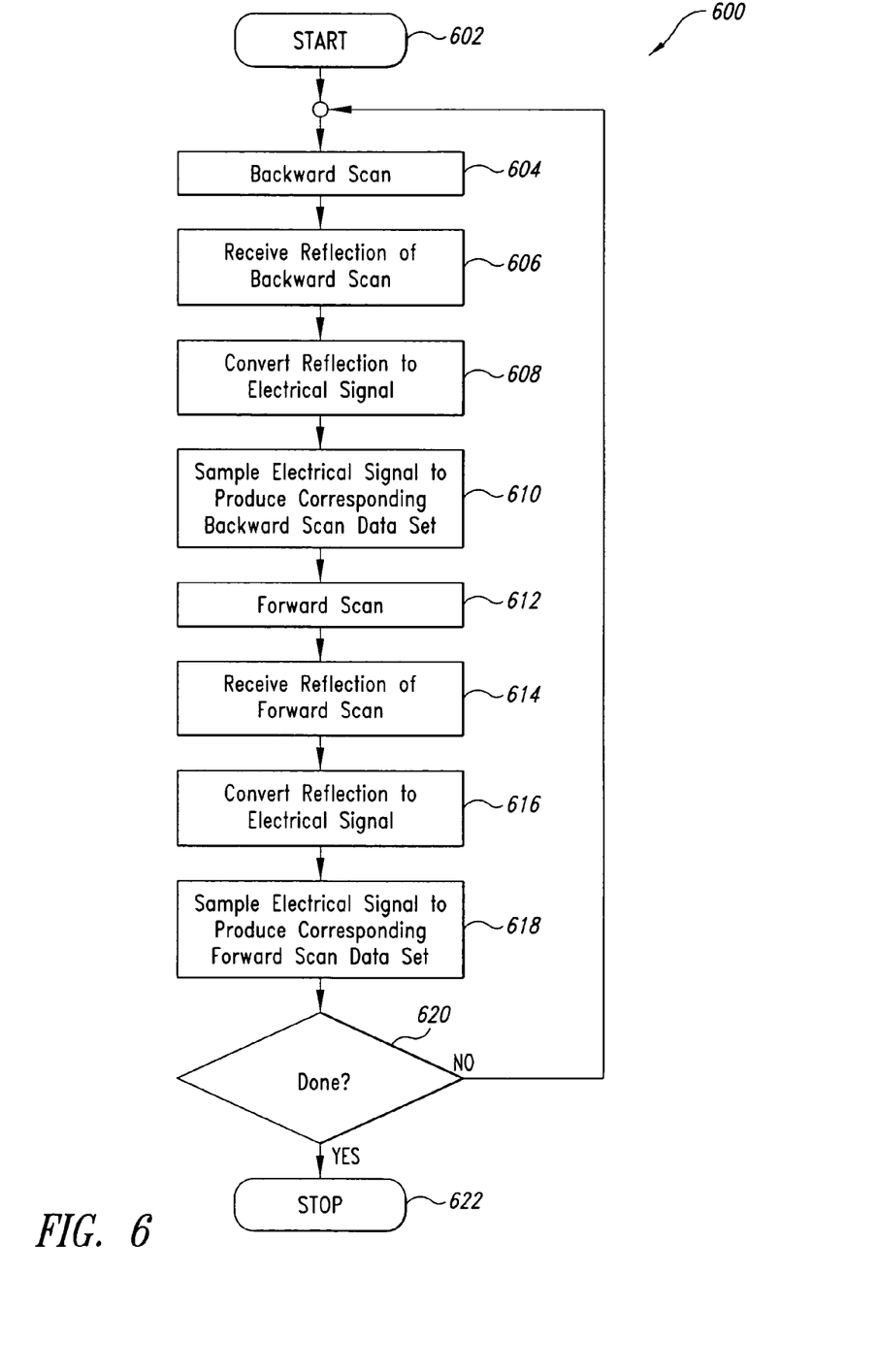
FIG. 6 is a flow diagram illustrating a scanning cycle of an embodiment of a laser scanning system employing interleaved sampling.

FIG. 6 illustrates an embodiment of a scanning cycle 600 of acquiring a machine-readable symbol using a scanner employing interleaved sampling, such as the system 500 illustrated in FIG. 5. At 602, the system starts and proceeds to 604, where it backward scans a machine-readable symbol. The system proceeds to 606, where it receives a reflection of the backward scan. The system proceeds from 606 to 608, where it converts the received reflection into an electrical signal corresponding to the reflected backward scan of the machine-readable symbol. The system proceeds from 608 to 610, where it samples the electrical signal to produce a backward scan sample data set. For the system 500 illustrated in FIG. 5, the sampling rate frequency $f_s$ is equal to the master clock frequency divided by the integer q. The system 500 proceeds to 612 where it forward scans the machine-readable symbol. From 612, the system proceeds to 614 where it receives a reflection of the forward scan of the machine-readable symbol. The system proceeds from 614 to 616, where it converts the reflected forward scan into an electrical signal. The system proceeds to 618, where it samples the electrical signal to produce a forward scan sample data set.

The sampling occurs at the sampling frequency $f_s$. The system proceeds to 620 where it determines whether it is done scanning the machine-readable symbol. For example, the system may receive a signal from the decoding module 526 indicating that the machine-readable symbol has been identified. If the answer at 620 is YES, the system proceeds to 622 where it stops. If the answer at 620 is NO, the system returns to 604, where another scanning cycle is performed. The frequency at which the scanning cycle operates in the embodiment of the system 500 illustrated in FIG. 5 is the frequency H of the master clock 528 divided by the integer n.

Figure 7:
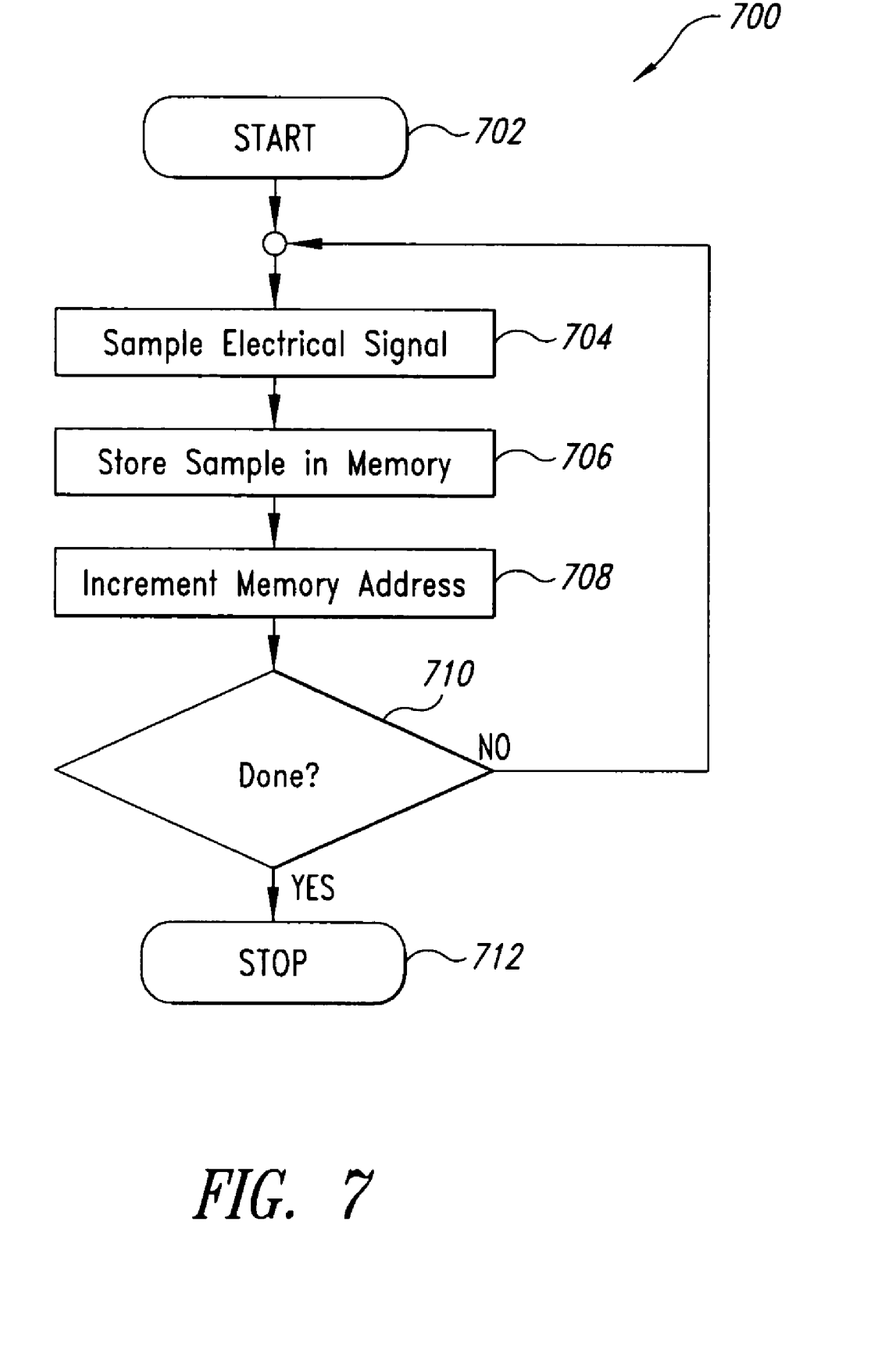
FIG. 7 is a flow diagram illustrating a sampling cycle of an embodiment of a laser scanning system employing interleaved sampling.

FIG. 7 illustrates an embodiment of an interleaved sampling cycle 700 suitable for use with the system 500 illustrated in FIG. 5. The system starts at 702, where it may perform initialization measures such as resetting the address module 548, and proceeds to 704. At 704, the system samples the electrical signal 542 produced by the reception subsystem 514 and proceeds to 706. At 706, the system stores a sample at an address in the memory 544 and proceeds to 708. At 708, the system increments the memory address to which the next sample will be stored and proceeds to 710. At 710, the system determines whether the scanning is complete. For example, the system may determine that the machine-readable symbol has been recognized. If the answer at 710 is YES, the system proceeds to 712 where it stops. If the answer at 710 is NO, the system returns to 704. The interleaved sampling cycle operates at a frequency $f_s$ equal to the frequency of the master clock 528 divided by the integer q.

For the system illustrated in FIG. 5, the system may increment the address (which has a modulo n) at 708 by q, automatically interleaving samples from the sets of samples gathered during the forward and backward scans and converting the interleaved data samples from the time domain to the spatial domain. Alternatively, the system may increment the address by 1, automatically interleaving the sets of samples gathered during the forward and backward scans, but leaving the interleaved data samples in the time domain. The samples can be converted to the spatial domain during further processing, such as processing by a decoder (see decoder 526 illustrated in FIG. 5).

Figure 8:
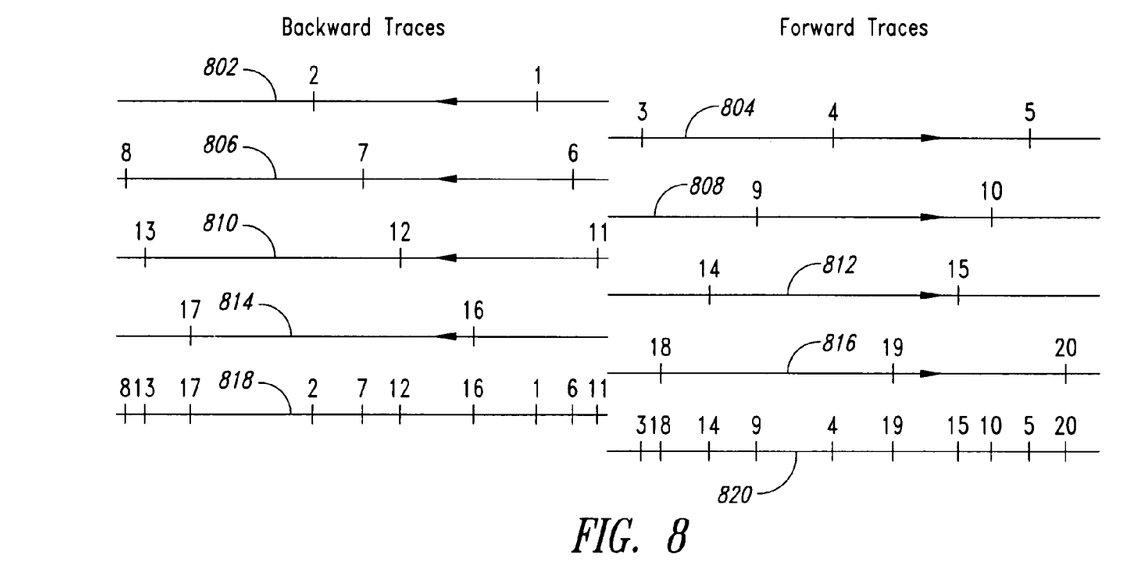
FIG. 8 is a timing diagram illustrating example sampling traces in an embodiment of a laser scanning system employing interleaved sampling.

FIG. 8 plots a stationary sampling grid of n samples over q periods of scanning, where n=21 and q=4, for a scanner that is arbitrarily de-phased by 10 percent of the sampling period. During the first backward trace 802, a set of samples comprising samples 1 and 2 is collected. During the first forward trace 804, a set of samples comprising samples 3, 4 and 5 is collected. During the second backward trace 806, a set of samples comprising samples 6, 7 and 8 is collected. During the second forward trace 808, a set of samples comprising samples 9 and 10 is collected. During the third backward trace 810, a set of samples comprising samples 11, 12 and 13 is collected. During the third forward trace 812, a set of samples comprising samples 14 and 15 is collected. During the fourth backward trace 814, a set of samples comprising samples 16 and 17 is collected. During the fourth forward trace 816, a set of samples comprising samples 18, 19 and 20 is collected. The accumulated backward traces are shown in trace 818 and the accumulated forward traces are shown in trace 820. The de-phasing error produces a shift of the sampled points, which does not impact bar code decoding when two separate representations are stored in the memory.

Figure 9:
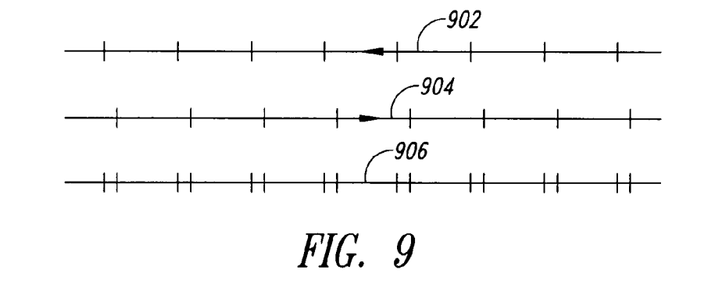
FIG. 9 is a timing diagram illustrating accumulated sampling traces in an embodiment of a laser scanning system employing interleaved sampling.

Instead of storing two separate representations in the memory by interleaving samples from the sets of samples, one representation associated with sets of samples gathered during backward scanning and one representation associated with sets of samples gathered during forward scanning with each representation containing n/2 data samples, a single representation containing n data samples can be stored by controlling the phase between the scanning frequency F and the sampling frequency $f_s$. FIG. 9 plots the stationary sampling grid of the accumulated backward traces 902 and the accumulated forward traces 904, where n=21 and q=4 with a clock delay of $0.4/f_s$. FIG. 9 also shows the combined trace 906 of the accumulated backward traces 902 and the accumulated forward traces 904.

For progressive sampling, as discussed above, an electromagnet scanner oscillating at 18 Hz has a sampling frequency $f_s$=37 ksps for a peak-to-peak angle θM of 25° and a 0.1 mm line resolution at 150 mm. For a miniature silicon mirror, such as those illustrated in FIGS. 2 and 3, of 1.5 mm width, progressive sampling would use a sampling frequency of 514 kHz under the same conditions. The sampling frequency of 37 ksps, however, can be approximately maintained for a miniature silicon mirror beam deflection system by using interleaved sampling. From equations 6 through 8:

$$f_s > nF/q \qquad \text{(Eq. 11)}.$$

Thus, $$q > nF/f_s \qquad \text{(Eq. 12)}.$$

To keep the number of samples and the sampling frequency approximately the same:

$$q > (4112)(250)/(37,000) \qquad \text{(Eq. 13)}$$

which leads to:

$$q > 27.784 \qquad \text{(Eq. 14)}.$$

Combining this with the requirement of equation 8, q is equal to 29, the next integer that makes n/q an irreducible fraction. The cycle frequency is 250/29=8.62 Hz, or 8.62 scans per second. Because the acquisition cycle results in storage in the memory of two representations comprised of interleaved samples (one representation associated with backward traces and one representation associated with forward traces), the effective scan rate is 8.62 times 2, or 17.24 scans/second. The sampling clock has been reduced from 514 kHz to 35.4 kHz, while maintaining the effective scan rate value.

It should be noted that the lower sampling rate is obtained at the expense of greater sensitivity of the scanner relative to motion with respect to the symbol. Assuming a still bar code, the maximum resolution is given by the Nyquist frequency of the scanner:

$$U_{NYQUIST} = 1/(2\Delta x) \qquad \text{(Eq. 15)}$$

where $\Delta_x$ is the spatial sampling interval. The highest bar code frequency that can be read without aliasing is the Nyquist frequency that corresponds to a sample per bar code bar or line. If instead the bar code moves with a constant velocity v in the forward scanning direction, the relative spot velocity of the symbol is reduced. The spatial sampling period with respect to the symbol is incremented by an amount $\partial_x$, with:

$$\partial_x = v \partial t \qquad \text{(Eq. 16)}$$

where $\partial t$ is the time between the sampling of two adjacent points. Then the new Nyquist frequency limit is given by $$U_{NYQUIST} = 1/(2(\Delta_x + \partial_x)) \qquad \text{(Eq. 17)}.$$

The width of a readable bar and space with respect to the scan is now wider by:

$$\Delta_w = (\Delta_x + \partial_x)/\Delta_x \qquad \text{(Eq. 18)},$$

where $\Delta_w$ is the increase in the width relative to the width for a still bar code symbol.

With progressive sampling, any two spatially consecutive sample points are sampled with an interval of time equal to the sampling clock period. In interleaved sampling, two spatially consecutive points are sampled with an interval of time equal to a multiple of the sampling clock period, where the multiple depends on the level of interleaving. Consequently, interleaved sampling is more sensitive to motion than progressive sampling.

For interleaved sampling, the maximum sampling time between two consecutive points is at least half the cycle of acquisition. To keep the Nyquist frequency within a desired tolerance, the motion along the scanning direction should be limited according to:

$$v_{max} = +/- ((x)(\text{BarWidth}))/(T/2) \qquad \text{(Eq. 19)}$$

where BarWidth is the thinnest bar or space that produces, when scanned, a signal free from aliasing, such that:

$$\text{BarWidth} = 1/(2U_{NYQUIST}) \qquad \text{(Eq. 20)}$$

and the acquisition time T is:

$$T = q/F \qquad \text{(Eq. 21)}.$$

For example, for an aliasing free 0.1 mm maximum code resolution (Nyquist frequency of the scanner), an acquisition time of 1/8.62 Hz=0.116 seconds, and a 50% maximum variation of the Nyquist frequency, the relative motion should not exceed 0.86 mm/sec. Thus, sensitivity to motion will limit the sampling rate reduction based on the desired spatial resolution. Bar codes with lower resolution will be more tolerant to motion, in proportion to the wider bar and space elements. The disclosed embodiments are well suited for use high-frequency devices for reading machine-readable symbols.

The terms "computer-readable memory medium" as used herein refers to any medium that participates in providing instructions to a system or a processor for execution, such as the processor 525 illustrated in FIG. 5. Such a medium may take many forms, including but not limited to, non-volatile media, volatile media, and transmission media. Non-volatile media includes, for example, hard, optical or magnetic disks. Volatile media includes dynamic memory, such as the memory 527 illustrated in FIG. 5. Transmission media includes coaxial cables, copper wire and fiber optics. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave, or any other medium from which a computer can read.

Various forms of computer readable media may be involved in carrying one or more sequences of one or more instructions to a processor for execution. For example, the instructions may initially be carried on a magnetic disk of a remote computer. The remote computer can load the instructions into its dynamic memory and send the instructions over a telephone line using a modem. A modem local to computer system can receive the data on the telephone line and use an infrared transmitter to convert the data to an infrared signal. An infrared detector coupled to a system bus can receive the data carried in the infrared signal and place the data on system bus. The system bus carries the data to system memory, from which a processor retrieves and executes the instructions. The instructions received by system memory may optionally be stored on storage device either before or after execution by the processor.

Although specific embodiments and examples are described herein for illustrative purposes, various equivalent modifications can be made without departing from the spirit and scope of the disclosure, as will be recognized by those skilled in the relevant art. The teachings provided herein can be applied to other systems for reading machine-readable symbols, not necessarily the bar code symbol reading system generally described above. The various embodiments described above can be combined to provide further embodiments. The illustrated methods can omit some acts, can add other acts, and can execute the acts in a different order than that illustrated. The teachings of the applications, patents and publications referred to herein, are incorporated by reference in their entirety.

These and other changes can be made in light of the above detailed description. In general, in the following claims, the terms used should not be construed to be limiting to the specific embodiments disclosed in the specification, but should be construed to include all systems for reading machine-readable symbols that operate in accordance with the claims. Accordingly, the invention is not limited by the disclosure, but instead its scope is to be determined entirely by the following claims.

The invention claimed is:

1. A method of acquiring a machine-readable symbol using an optoelectronic device, the method comprising:
   scanning the machine-readable symbol with a plurality of scanning passes occurring at a scanning frequency;
   receiving reflected scans corresponding to the plurality of scanning passes;
   converting the reflected scans to an electrical signal;
   sampling the electrical signal at a sampling frequency thereby producing data samples associated with corresponding scanning passes;
   interleaving data samples associated with at least two of the scanning passes to produce a representation in a memory, wherein the sampling frequency is proportional to the scanning frequency by a quotient of twice a number of samples in the representation and an integer such that the quotient is an irreducible fraction; and
   decoding the representation.

2. The method of claim 1 wherein the representation in the memory is a representation in a time domain.

3. The method of claim 1 wherein the representation in the memory is a representation in a spatial domain.

4. The method of claim 1 wherein interleaving data samples comprises:
   storing a first data sample in the memory at an address;
   incrementing the address; and
   storing a second data sample in the memory at the incremented address.

5. The method of claim 4 wherein the memory address is incremented by one.

6. The method of claim 4 wherein the memory address is incremented by the integer.

7. The method of claim 1 wherein the scanning the machine-readable symbol with a plurality of scanning passes occurring at a scanning frequency comprises:
   driving a beam deflection system at the scanning frequency.

8. The method of claim 7 wherein the beam deflection system comprises a silicon micro-mirror suspension system.

9. The method of claim 1 wherein the machine-readable symbol is a bar code symbol.

10. The method of claim 1 wherein the plurality of scanning passes is a plurality of backward scanning passes and the representation is a first representation associated with the plurality of backward scanning passes, the method further comprising:
scanning the machine-readable symbol with a plurality of forward scanning passes occurring at the scanning frequency, wherein receiving reflected scans corresponding to the plurality of scanning passes comprises receiving reflected scans corresponding to the plurality of backward scanning passes and to the plurality of forward scanning passes; and
interleaving data samples associated with at least two of the forward scanning passes to produce a second representation in the memory.

11. The method of claim 1, further comprising:
scanning the machine-readable symbol with additional scanning passes occurring at the scanning frequency;
receiving additional reflected scans corresponding to the additional scanning passes;
converting the additional reflected scans corresponding to the additional scanning passes to an additional electrical signal;
sampling the additional electrical signal at the sampling frequency thereby producing additional data samples associated with corresponding additional scanning passes; and
interleaving data samples associated with at least two of the additional scanning passes to refresh the representation in the memory.

12. A method of acquiring a machine-readable symbol using an optoelectronic device, the method comprising:
scanning the machine-readable symbol with a plurality of scanning passes occurring at a scanning frequency;
receiving reflected scans corresponding to the plurality of scanning passes;
converting the reflected scans to an electrical signal;
sampling the electrical signal at a sampling frequency thereby producing data samples associated with corresponding scanning passes; and
interleaving data samples associated with at least two of the scanning passes to produce a representation in a memory, wherein the representation in the memory comprises a number of data samples and the sampling frequency is proportional to the scanning frequency by a quotient of a product of the number of data samples in the representation and a natural number divided by an integer, such that the quotient is a irreducible fraction.

13. The method of claim 12 wherein the representation in the memory is a representation in a time domain.

14. The method of claim 12 wherein the representation in the memory is a representation in a spatial domain.

15. The method of claim 12 wherein interleaving data samples comprises:
storing a first data sample in the memory at an address;
incrementing the address; and
storing a second data sample in the memory at the incremented address.

16. The method of claim 15 wherein the memory address is incremented by one.

17. The method of claim 12, wherein the natural number is two.

18. The method of claim 12 wherein the natural number is one.

19. The method of claim 12 wherein the scanning the machine-readable symbol with a plurality of scanning passes occurring at a scanning frequency comprises:
driving a beam deflection system at the scanning frequency.

20. The method of claim 19 wherein the beam deflection system comprises a silicon micro-mirror suspension system.

21. The method of claim 12 wherein the machine-readable symbol is a bar code symbol.

22. The method of claim 12 wherein the scanning frequency exceeds 200 Hz.

23. The method of claim 12 wherein the plurality of scanning passes is a plurality of backward scanning passes and the representation is a first representation associated with the plurality of backward scanning passes, the method further comprising:
scanning the machine-readable symbol with a plurality of forward scanning passes occurring at the scanning frequency, wherein receiving reflected scans corresponding to the plurality of scanning passes comprises receiving reflected scans corresponding to the plurality of backward scanning passes and to the plurality of forward scanning passes; and
interleaving data samples associated with at least two of the forward scanning passes to produce a second representation in the memory.

24. The method of claim 12, further comprising:
scanning the machine-readable symbol with additional scanning passes occurring at the scanning frequency;
receiving additional reflected scans corresponding to the additional scanning passes;
converting the additional reflected scans corresponding to the additional scanning passes to an additional electrical signal;
sampling the additional electrical signal at the sampling frequency thereby producing additional data samples associated with corresponding additional scanning passes; and
interleaving data samples associated with at least two of the additional scanning passes to refresh the representation in the memory.

25. An optoelectronic device for acquiring a machine-readable symbol, comprising:
a beam subsystem configured to generate scanning beam passes at a scanning frequency;
a reception subsystem configured to convert light reflected from the scanning beam passes to an electrical signal;
a sampler configured to sample the electrical signal at a sampling frequency, thereby producing sets of samples associated with corresponding scanning beam passes; and
a memory configured to interleave samples from at least two of the sets of samples, thereby producing a representation in the memory, wherein the sampling frequency is proportional to the scanning frequency by a quotient of a product of data samples in the representation in the memory and a natural number divided by an integer, such that the quotient is an irreducible fraction.

26. The device of claim 25 wherein the beam subsystem comprises a rotating polygonal mirror.

27. The device of claim 25 wherein the beam subsystem comprises a silicon micro-mirror suspension system configured to oscillate at the scanning frequency.

28. The device of claim 25 wherein the memory is configured to produce a time-domain representation.

29. The device of claim 25 wherein the memory is configured to produce a spatial-domain representation.

30. The device of claim 25 wherein the memory is configured to:
   store a data sample at an address;
   increment the address; and
   store a subsequent data sample at the incremented address.

31. The device of claim 30 wherein the memory is configured to increment the address by one.

32. The device of claim 30 wherein the memory is configured to increment the address by the integer.

33. The device of claim 25 wherein the natural number is one.

34. The device of claim 25 wherein the natural number is two.

35. The device of claim 25 wherein the scanning frequency exceeds 200 Hz.

36. The device of claim 25 wherein the scanning beam passes comprise backward and forward scanning beam passes and the memory is configured to interleave samples from sets of samples associated with at least two backward scanning beam passes and from sets of samples associated with at least two forward scanning beam passes, thereby producing two representations in the memory.

37. The device of claim 25 wherein the memory is configured to interleave samples from sets of samples associated with additional scanning beam passes, thereby refreshing the representation in the memory.

38. A device for acquiring a machine-readable symbol, comprising:
   means for generating a scanning beam at a scanning frequency;
   means for converting light reflected from the scanning beam to an electrical signal;
   means for sampling the electrical signal at a sampling frequency; and
   means for interleaving samples of the electrical signal associated with a plurality of scanning beam passes, thereby producing a representation, wherein the means for interleaving samples comprises a memory having a modulo and the sampling frequency is proportional to the scanning frequency by a quotient of a product of the modulo and a natural number divided by an integer such that the quotient is an irreducible fraction.

39. The device of claim 38 wherein the means for generating a scanning beam comprises a silicon micro-mirror suspension system.

40. The device of claim 38 wherein the natural number is one.

41. The device of claim 38 wherein the machine-readable symbol is a bar code symbol.

42. A computer readable memory medium loadable in a memory of a processor of a system, comprising software code portions for causing the system to:
   scan a machine-readable symbol with a plurality of scanning passes occurring at a scanning frequency;
   sample, at a sampling frequency, an electrical signal corresponding to light reflected from the plurality of scanning passes, thereby producing samples associated with corresponding scanning passes; and
   interleave samples associated with at least two scanning passes, thereby producing a representation in a memory, wherein the sampling frequency is proportional to the scanning frequency by a quotient of a product of a number of data samples in the representation and a natural number divided by an integer such that the quotient is an irreducible fraction.

43. The computer readable memory medium of claim 42 further comprising software code portions for causing the system to convert the representation from a time-domain format to a spatial-domain format.

44. The computer-readable memory medium of claim 42 wherein the natural number is one.

45. The computer-readable memory medium of claim 42 wherein the natural number is two.

* * * * *